(12) United States Patent
LeBeau

(10) Patent No.: US 11,199,243 B2
(45) Date of Patent: Dec. 14, 2021

(54) CARABINER WITH PINCHING MECHANISM

(71) Applicant: LeBeau Inc., Logan, UT (US)

(72) Inventor: Mark William LeBeau, Logan, UT (US)

(73) Assignee: LeBeau Inc., Logan, UT (US)

( * ) Notice: Subject to any disclaimer, the term of this patent is extended or adjusted under 35 U.S.C. 154(b) by 0 days.

(21) Appl. No.: 15/930,190

(22) Filed: May 12, 2020

(65) Prior Publication Data

US 2020/0271192 A1     Aug. 27, 2020

Related U.S. Application Data

(63) Continuation of application No. 15/993,547, filed on May 30, 2018, now Pat. No. 10,648,535.

(60) Provisional application No. 62/512,253, filed on May 30, 2017.

(51) Int. Cl.
| | |
|---|---|
| *F16G 11/04* | (2006.01) |
| *F16B 45/02* | (2006.01) |
| *F16G 11/10* | (2006.01) |
| *F16G 11/14* | (2006.01) |

(52) U.S. Cl.
CPC ............ *F16G 11/048* (2013.01); *F16B 45/02* (2013.01); *F16G 11/101* (2013.01); *F16G 11/108* (2013.01); *F16G 11/143* (2013.01)

(58) Field of Classification Search
CPC ...... F16B 45/02; F16G 11/048; F16G 11/101; F16G 11/108; F16G 11/143
See application file for complete search history.

(56) References Cited

U.S. PATENT DOCUMENTS

| | | | | |
|---|---|---|---|---|
| 691,630 | A * | 1/1902 | Huberdeau | F16B 45/02 24/599.6 |
| 2,481,610 | A * | 9/1949 | Meighan | F16G 11/143 24/129 R |
| D285,989 | S * | 10/1986 | MacDonald | D3/207 |
| 4,622,724 | A * | 11/1986 | Dupre | F16B 45/00 24/130 |
| 5,210,914 | A * | 5/1993 | Katsma | F16B 45/02 24/588.1 |
| 5,384,943 | A * | 1/1995 | LeFebvre | F16B 45/02 24/599.5 |
| D740,105 | S * | 10/2015 | Kelleghan | D8/356 |
| D746,662 | S * | 1/2016 | Kelleghan | D8/356 |
| 9,254,778 | B2 * | 2/2016 | Gangakhedkar | F16B 45/02 |
| D808,240 | S * | 1/2018 | Kelleghan | D8/105 |
| D813,651 | S * | 3/2018 | Votel | D8/356 |
| D835,974 | S * | 12/2018 | Moore | D8/356 |
| 2008/0016659 | A1 * | 1/2008 | Peterson | F16B 45/02 24/599.1 |

(Continued)

*Primary Examiner* — David M Upchurch
(74) *Attorney, Agent, or Firm* — Seth Black; Black IP, PLLC

(57) ABSTRACT

The present invention extends to a carabiner intended for use as an adjustable anchor. In general, embodiments of the invention include a carabiner that includes a pinching mechanism. More specifically, some embodiments of the invention include a carabiner having a pinching mechanism that includes one of a slidable pin, a rotatable cam, or a pivotable block. Additionally, some embodiments of the invention include a rope, whereas other embodiments can be used with a rope supplied by a climber.

16 Claims, 11 Drawing Sheets

(56) References Cited

U.S. PATENT DOCUMENTS

2008/0222859 A1\* 9/2008 Chepurny ............ A61G 7/1049
                                                  24/599.2
2018/0154196 A1\* 6/2018 Cowell .............. A62B 35/0031

\* cited by examiner

CARABINER WITH PINCHING MECHANISM

CROSS-REFERENCE TO RELATED APPLICATIONS

This application is a continuation of U.S. Non-Provisional patent application Ser. No. 15/993,547, entitled "CARABINER WITH PINCHING MECHANISM," filed May 30, 2018 by Mark William LeBeau, which claims the benefit of, and priority to, U.S. Provisional Patent Application Ser. No. 62/512,253, entitled "LOCKING CARABINER WITH SLIDABLE PIN," filed May 30, 2017 by Mark William LeBeau, the entire contents of the foregoing applications are hereby expressly incorporated by reference in their entirety.

BACKGROUND

1. Field of the Invention

The invention relates to the field of climbing and, more particularly, it relates to a carabiner having a pinching mechanism to provide an adjustable anchor for a climber.

2. Background and Relevant Art

A carabiner is a specialized type of shackle usually made from a metal, such as steel or aluminum. In general, a carabiner includes a frame and a gate that selectively opens and closes to form a complete loop. More particularly, the gate is typically pivotally connected to one end of the frame and selectively engages a nose at another end of the frame to form the loop. Additionally, the gate is usually spring-loaded, biased toward closing the loop. In some cases, a gate may include an optional locking sleeve which locks the gate in the closed position to secure the complete loop. Typically, the frame of a carabiner further includes a spine that connects to both a basket of the frame and a crotch of the frame that is opposite the basket. Oftentimes rope, cord, or webbing is threaded through either the basket or the crotch or both. Moreover, a carabiner can take a variety of shapes, such as oval shaped, regular D-shaped, asymmetrical D-shaped, and pear shaped.

Thus, in light of their specific shape and components, carabiners are widely used in rope-intensive activities such as climbing, arboriculture, caving, sailing, hot air ballooning, rope rescue, construction, industrial rope work, window cleaning, whitewater rescue, and acrobatics. Oftentimes, such rope-intensive activities require a climber to anchor to various support surfaces. This typically involves a climber connecting a climbing harness to an anchor secured to a support surface. For example, it is frequently the case that a rock climber connects their harness to a climbing surface by forming an anchor using multiple devices, such as a carabiner and a sling or a piece of rope. In some cases, a climber may form an anchor that includes two carabiners and a daisy chain.

Accordingly, one problem with conventional carabiners is that multiple other devices, such as additional carabiners, rope, slings, or daisy chains are needed to form a safe anchor to a support surface. Consequently, this requires climbers to carry more equipment than may be ideal.

Additionally, another problem with conventional carabiners is that anchors formed using such carabiners are not easily and finely adjustable. For example, the length of the anchor formed using two carabiners and a daisy chain can only be adjusted in increments that correspond to the size of the loops in the daisy chain. In other words, anchors formed from conventional carabiners are typically not infinitely adjustable.

In view of problems such as those noted above, and others, it would be useful to provide an integrated carabiner that can be used as an anchor without the necessity for additional multiple devices. Moreover, it would be useful to provide a carabiner that can serve as a more easily and finely adjustable anchor. Therefore, conventional carabiners have various limitations that are desirable to overcome.

BRIEF SUMMARY

The present invention extends to a carabiner having a pinching mechanism. In one aspect, a carabiner includes a frame, a gate, a pinching mechanism, and a rope. The gate is connected to the frame and movable between a closed position and an open position. The pinching mechanism is integrated into the frame forming a channel between the frame and the pinching mechanism. Moreover, the pinching mechanism is movable between a pinched position and an unpinched position. Furthermore, the rope passes through the channel. The rope is also configured to be pinched between the frame and the pinching mechanism when in the pinched position and unpinched between the frame and the pinching mechanism when in the unpinched position.

In another aspect, a carabiner includes a frame, a gate, a pinching mechanism that includes a pin slidably mounted within the frame, and a rope. The pinching mechanism is integrated into the frame forming a channel. The channel can include a first channel opening configured to receive a first portion of rope and a second channel opening configured to receive a second portion of rope. Moreover, the frame can include a crotch having a front side with a front groove and a rear side with a rear groove, the rear side opposite the front side. Furthermore, the pin slidably mounted within the frame can include a front button slidably mounted within the front groove, a rear button slidably mounted within the rear groove, and a stem connected to the front and rear buttons. Thus, the channel can be more specifically formed by the space between the crotch of the frame and the stem of the pin slidably mounted within the frame. Additionally, the crotch of the frame can further include a protrusion positioned proximate the channel. Accordingly, the stem can move toward the pinched position when force is applied to the rope in a direction that forces the stem toward the protrusion and it can move toward the unpinched position when force is applied to the rope in a direction that forces the stem away from the protrusion.

In a further aspect, a carabiner includes a frame, a gate, a pinching mechanism that includes a shaft and a cam rotationally connected to the shaft, and a rope. The pinching mechanism is integrated into the frame forming a channel. The channel can include a first channel opening configured to receive a first portion of rope and a second channel opening configured to receive a second portion of rope. Moreover, the frame can include a crotch having a front side with a front groove and a rear side with a rear groove, the rear side opposite the front side. Furthermore, the cam rotationally connected to the shaft can include a front guide rod slidably mounted within the front groove, a rear guide rod slidably mounted within the rear groove, and a stem connected to the front guide rod and the rear guide rod. Therefore, the channel can be more specifically formed by the space between the crotch of the frame and the stem of the cam rotationally connected to the shaft. Additionally, the crotch of the frame can further include a protrusion positioned proximate the channel. Also, the pinching mechanism can include a spring that biases the cam toward the unpinched position. Nevertheless, when force is applied to the rope in a direction that forces the stem toward the protrusion, the stem can move toward the pinched position, and when force is applied to the rope in a direction that forces the stem away from the protrusion, the stem can move toward the unpinched position.

In an even further aspect, a carabiner includes a frame, a gate, a pinching mechanism that includes a pivot and a block pivotally connected to the pivot, and a rope. The pinching mechanism is integrated into the frame forming a channel. The channel can include a first channel opening configured to receive a first portion of rope and a second channel opening configured to receive a second portion of rope. Moreover, the frame can include a crotch having a frame surface and the pivot can be positioned on the crotch. The block can also include a stem having a concave perimeter surface. Thus, the channel can be more particularly formed by the frame surface of the crotch and at least a portion of the concave perimeter surface of the stem of the block. Furthermore, the crotch of the frame can include a protrusion positioned on the frame surface of the crotch proximate the channel. Consequently, the stem can move toward the pinched position when force is applied to the rope in a direction that forces the stem toward the protrusion and the stem can move toward the unpinched position when force is applied to the rope in a direction that forces the stem away from the protrusion.

BRIEF DESCRIPTION OF THE DRAWINGS

In order to describe the manner in which the aspects and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
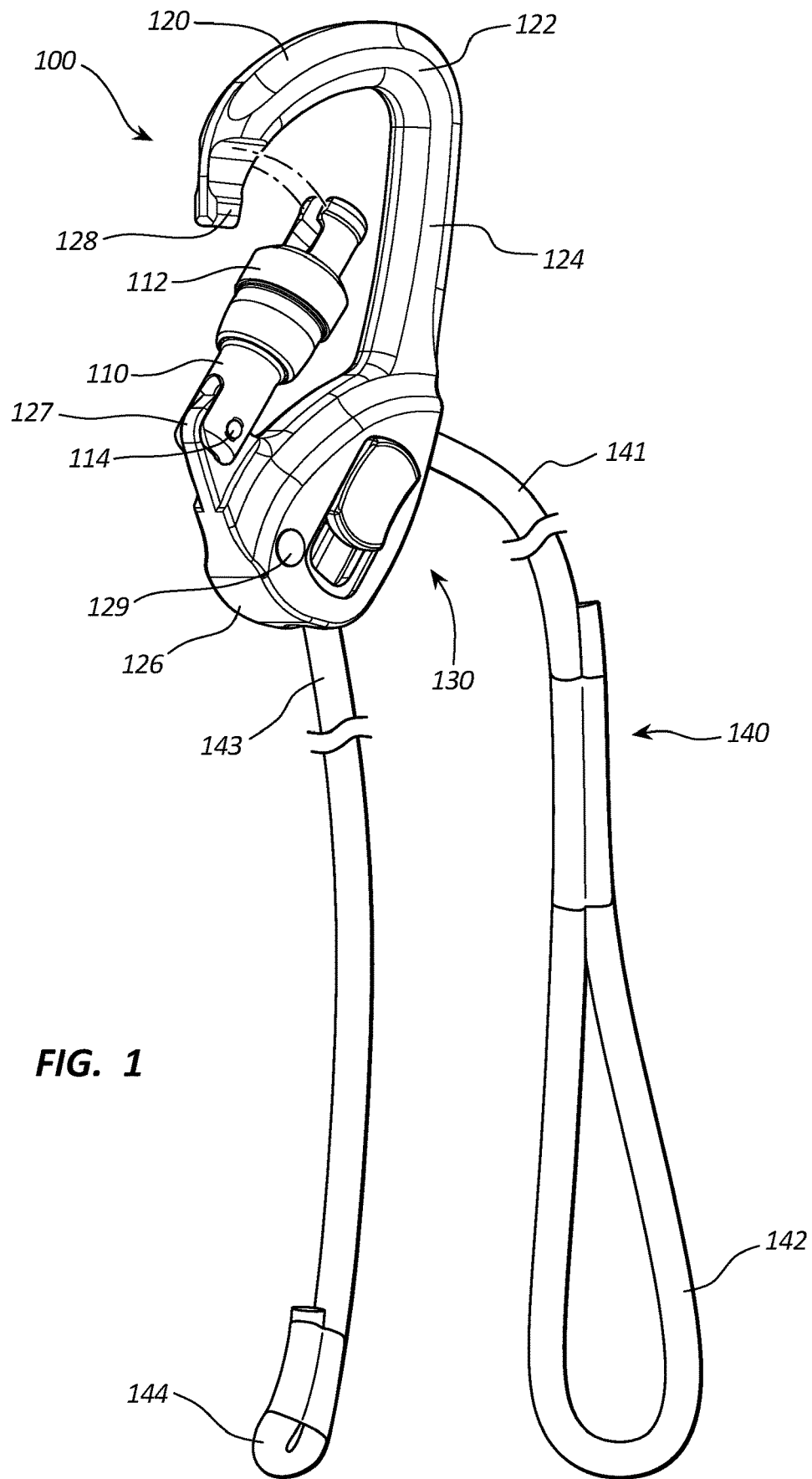
FIG. 1 illustrates an example carabiner in accordance with a first embodiment.

The present invention extends to a carabiner. In one aspect, the carabiner is used to anchor to a support surface. More specifically, the carabiner can secure a climber by connecting the climber, such as on their harness, to the support surface, such as on a bolt permanently secured to a rock wall. In another aspect, the carabiner is an integrated, single, standalone device that can be used to anchor to the support surface, thereby reducing the amount of equipment the climber needs to carry. In yet another aspect, the carabiner provides an anchor that is easily and finely adjustable in length or distance between the climber and the support surface.

In one embodiment of the invention, a carabiner includes a frame, a gate, a pinching mechanism, and a rope.

The frame of the carabiner can further include a nose, a basket, a spine, a crotch, and a gate pivot head. The nose mates with the gate in a closed position. The basket is adjacent to the nose and the spine. The basket is also substantially perpendicular to the gate in the closed position. The spine is adjacent to the basket and opposite the gate in the closed position. The crotch is adjacent to the spine and opposite the basket. The gate pivot head protrudes from the crotch to pivotally connect to the gate using a gate pivot rod.

The gate is pivotally connected to the frame and movable between a closed position and an open position. Accordingly, the gate is configured to be either open or closed. Thus, when open, the gate, in conjunction with the frame, can be configured to hook or otherwise connect the carabiner to a support surface. When closed, the gate, in conjunction with the frame, can be configured to provide a secure, continuous loop that can be used to anchor a climber. The gate can further include a locking sleeve.

The pinching mechanism is integrated into the frame forming a channel between the frame and the pinching mechanism. The pinching mechanism is also movable between a pinched position and an unpinched position. The pinching mechanism can also further include a spring that biases the pinching mechanism toward the unpinched position.

The pinching mechanism is configured to restrict movement of a portion of the rope by pinching the portion of the rope against the frame. Thus, when the pinching mechanism is in the pinched position, the carabiner can be used as a fixed anchor for a climber when the carabiner is connected to a support surface and the rope is connected to the climber. Also, the pinching mechanism can be configured to allow the free movement of a portion of the rope by unpinching the portion of the rope away from the frame, thereby allowing the rope to travel freely through the channel formed by the frame and the pinching mechanism. Thus, when the pinching mechanism is in the unpinched position, the carabiner can be used as an adjustable anchor for a climber when the length of the rope connected between the carabiner and the climber is adjusted by the climber as desired by pulling the rope through the channel to shorten or lengthen the portion of rope connected between the carabiner and the climber.

The pinching mechanism can include one of a slidable pin, a rotatable cam, a pivotable block, or other equivalents. As for the pinching mechanism, Applicant intends to encompass any structure presently existing or developed in the future that performs the same or similar function as the pinching mechanisms described herein. Moreover, the pinching mechanism can be integrated into the frame at a crotch of the frame. Furthermore, the frame can further include a frame surface positioned proximate the channel. The pinching mechanism can further include a stem movable toward the frame surface to pinch the rope against the frame surface when in the pinched position and movable away from the frame surface to unpinch the rope when in the unpinched position. The frame surface can also further include a protrusion. Additionally, the pinching mechanism can move toward the pinched position when force is applied to the rope in a direction that forces the rope against a surface of the pinching mechanism. Also, the pinching mechanism can move toward the unpinched position when force is applied to the rope in a direction that forces the rope away from the surface of the pinching mechanism.

The rope passes through the channel and is configured to move freely through the channel. Furthermore, the rope is configured to be pinched between the frame and the pinching mechanism when in the pinched position and unpinched between the frame and the pinching mechanism when in the unpinched position. The rope can further include a first portion having a loop that prevents the loop from traveling completely through the channel by way of a first channel opening and a second portion having an end that prevents the end from traveling completely through the channel by way of a second channel opening.

In another embodiment of the invention, a carabiner includes a frame, a gate, a pinching mechanism including a pin slidably mounted within the frame, and a rope.

The frame can further include a crotch. The crotch can further include a front side, a rear side opposite the front side, a front groove on the front side, and a rear groove on the rear side. The crotch can also further include a protrusion positioned proximate a channel formed between the frame and the pinching mechanism.

The gate is pivotally connected to the frame and movable between a closed position and an open position. Accordingly, the gate is configured to be either open or closed. Thus, when open, the gate, in conjunction with the frame, can be configured to hook or otherwise connect the carabiner to a support surface. When closed, the gate, in conjunction with the frame, can be configured to provide a secure, continuous loop that can be used to anchor a climber. The gate can further include a locking sleeve.

The pinching mechanism is integrated into the frame forming a channel between the frame and the pinching mechanism. The pinching mechanism is also movable between a pinched position and an unpinched position. The pinching mechanism can also further include a spring that biases the pin toward the unpinched position.

The pinching mechanism is configured to restrict movement of a portion of the rope by pinching the portion of the rope against the frame. Thus, when the pinching mechanism is in the pinched position, the carabiner can be used as a fixed anchor for a climber when the carabiner is connected to a support surface and the rope is connected to the climber. Also, the pinching mechanism can be configured to allow the free movement of a portion of the rope by unpinching the portion of the rope away from the frame, thereby allowing the rope to travel freely through the channel formed by the frame and the pinching mechanism. Thus, when the pinching mechanism is in the unpinched position, the carabiner can be used as an adjustable anchor for a climber when the length of the rope connected between the carabiner and the climber is adjusted by the climber as desired by pulling the rope through the channel to shorten or lengthen the portion of rope connected between the carabiner and the climber.

The pin slidably mounted within the frame can further include a front button slidably mounted within the front groove of the front side of the crotch of the frame, a rear button slidably mounted within the rear groove of the rear side of the crotch of the frame, and a stem connected to the front button and the rear button. Moreover, the stem can be configured to move toward the pinched position when force is applied to the rope in a direction that forces the stem toward a protrusion positioned proximate the channel. Additionally, the stem can be configured to move toward the unpinched position when force is applied to the rope in a direction that forces the stem away from a protrusion positioned proximate the channel.

The rope passes through the channel and is configured to move freely through the channel. Furthermore, the rope is configured to be pinched between the frame and the pinching mechanism when in the pinched position and unpinched between the frame and the pinching mechanism when in the unpinched position.

The channel can include a first channel opening configured to receive a first portion of the rope and a second channel opening configured to receive a second portion of the rope. The channel can also be formed by the crotch of the frame and the stem of the pin slidably mounted within the frame.

In yet another embodiment of the invention, a carabiner includes a frame, a gate, a pinching mechanism including a shaft and a cam rotationally connected to the shaft, and a rope.

The frame can further include a crotch. The crotch can further include a front side, a rear side opposite the front side, a front groove on the front side, and a rear groove on the rear side. The crotch can also further include a protrusion positioned proximate a channel formed between the frame and the pinching mechanism.

The gate is pivotally connected to the frame and movable between a closed position and an open position. Accordingly, the gate is configured to be either open or closed. Thus, when open, the gate, in conjunction with the frame, can be configured to hook or otherwise connect the carabiner to a support surface. When closed, the gate, in conjunction with the frame, can be configured to provide a secure, continuous loop that can be used to anchor a climber. The gate can further include a locking sleeve.

The pinching mechanism is integrated into the frame forming a channel between the frame and the pinching mechanism. The pinching mechanism is also movable between a pinched position and an unpinched position. The pinching mechanism can also further include a spring that biases the cam toward the unpinched position.

The pinching mechanism is configured to restrict movement of a portion of the rope by pinching the portion of the rope against the frame. Thus, when the pinching mechanism is in the pinched position, the carabiner can be used as a fixed anchor for a climber when the carabiner is connected to a support surface and the rope is connected to the climber. Also, the pinching mechanism can be configured to allow the free movement of a portion of the rope by unpinching the portion of the rope away from the frame, thereby allowing the rope to travel freely through the channel formed by the frame and the pinching mechanism. Thus, when the pinching mechanism is in the unpinched position, the carabiner can be used as an adjustable anchor for a climber when the length of the rope connected between the carabiner and the climber is adjusted by the climber as desired by pulling the rope through the channel to shorten or lengthen the portion of rope connected between the carabiner and the climber.

The cam rotationally connected to the shaft can further include a front guide rod slidably mounted within the front groove of the front side of the crotch of the frame, a rear guide rod slidably mounted within the rear groove of the rear side of the crotch of the frame, and a stem connected to the front guide rod and the rear guide rod. Moreover, the stem can be configured to move toward the pinched position when force is applied to the rope in a direction that forces the stem toward a protrusion positioned proximate the channel. Additionally, the stem can be configured to move toward the unpinched position when force is applied to the rope in a direction that forces the stem away from a protrusion positioned proximate the channel.

The rope passes through the channel and is configured to move freely through the channel. Furthermore, the rope is configured to be pinched between the frame and the pinching mechanism when in the pinched position and unpinched between the frame and the pinching mechanism when in the unpinched position.

The channel can include a first channel opening configured to receive a first portion of the rope and a second channel opening configured to receive a second portion of the rope. The channel can also be formed by the crotch of the frame and the stem of the cam rotationally connected to the shaft.

In an additional embodiment of the invention, a carabiner includes a frame, a gate, a pinching mechanism including a pivot and a block pivotally connected to the pivot, and a rope.

The frame can further include a crotch having a frame surface. The crotch can further include a protrusion positioned on the frame surface of the crotch proximate a channel formed between the frame and the pinching mechanism.

The gate is pivotally connected to the frame and movable between a closed position and an open position. Accordingly, the gate is configured to be either open or closed. Thus, when open, the gate, in conjunction with the frame, can be configured to hook or otherwise connect the carabiner to a support surface. When closed, the gate, in conjunction with the frame, can be configured to provide a secure, continuous loop that can be used to anchor a climber. The gate can further include a locking sleeve.

The pinching mechanism is integrated into the frame forming a channel between the frame and the pinching mechanism. The pinching mechanism is also movable between a pinched position and an unpinched position. The pinching mechanism can also further include a spring that biases the block toward the unpinched position.

The pinching mechanism is configured to restrict movement of a portion of the rope by pinching the portion of the rope against the frame. Thus, when the pinching mechanism is in the pinched position, the carabiner can be used as a fixed anchor for a climber when the carabiner is connected to a support surface and the rope is connected to the climber. Also, the pinching mechanism can be configured to allow the free movement of a portion of the rope by unpinching the portion of the rope away from the frame, thereby allowing the rope to travel freely through the channel formed by the frame and the pinching mechanism. Thus, when the pinching mechanism is in the unpinched position, the carabiner can be used as an adjustable anchor for a climber when the length of the rope connected between the carabiner and the climber is adjusted by the climber as desired by pulling the rope through the channel to shorten or lengthen the portion of rope connected between the carabiner and the climber.

The pivot can be positioned on the crotch of the frame.

The block pivotally connected to the pivot can further include a stem having a concave perimeter surface. Moreover, the stem can be configured to move toward the pinched position when force is applied to the rope in a direction that forces the stem toward a protrusion positioned on a frame surface of a crotch of the frame proximate the channel. Additionally, the stem can be configured to move toward the unpinched position when force is applied to the rope in a direction that forces the stem away from a protrusion positioned on a frame surface of a crotch of the frame proximate the channel.

The rope passes through the channel and is configured to move freely through the channel. Furthermore, the rope is configured to be pinched between the frame and the pinching mechanism when in the pinched position and unpinched between the frame and the pinching mechanism when in the unpinched position.

The channel can include a first channel opening configured to receive a first portion of the rope and a second channel opening configured to receive a second portion of the rope. The channel can also be formed by the frame surface of the crotch of the frame and at least a portion of the concave perimeter surface of the stem of the block pivotally connected to the pivot.

With respect to FIGS. 1-5, various configurations and aspects of various embodiments of the present invention are depicted.

Turning to FIG. 1, an example carabiner 100 is depicted in accordance with a first embodiment. The carabiner 100 includes a gate 110, a frame 120, a pinching mechanism 130, and a rope 140. In FIG. 1, gate 110 is pivotally connected to frame 120 at gate pivot head 127 using gate pivot rod 114. Gate 110 further includes a locking sleeve 112. In FIG. 1, gate 110 is shown in an open position which enables the carabiner to be hooked or attached to a support surface, such as a permanent bolt on a rock wall. However, gate 110 can pivot to a closed position which creates a continuous loop formed by gate 110 and frame 120.

FIG. 1 further illustrates frame 120 includes a basket 122, a spine 124, a crotch 126, a gate pivot head 127, a nose 128, and a protrusion 129. Basket 122 is adjacent to spine 124 and nose 128. Spine 124 is adjacent to basket 122 and crotch 126. Crotch 126 is adjacent to gate pivot head 127 which protrudes to create a hinge with gate 110. Nose 128 engages or mates with the gate 110 when in the closed position. Additionally, locking sleeve 112 screws over nose 128 and an end of gate 110 to secure the gate 110 in the closed position. Protrusion 129 is proximate pinching mechanism 130 and provides a surface against which pinching mechanism 130 can selectively pinch rope 140. The position of protrusion 129 generally indicates the position at which rope 140 is pinched by pinching mechanism 130 when in a pinched position. However, in one or more embodiments of the invention, the pinching mechanism 130 pinches the rope 140 against a surface of frame 120 rather than against a protrusion 129. Thus, it should be appreciated that protrusion 129 is optional to the functionality of pinching mechanism 130.

FIG. 1 also illustrates pinching mechanism 130 is integrated into frame 120 proximate crotch 126. However, in other embodiments of the invention, pinching mechanism 130 can be integrated into frame 120 proximate other portions of frame 120, such as basket 122 and spine 124. Additionally, in other embodiments of the invention, pinching mechanism 130 can further include a spring that biases the pinching mechanism 130 toward an unpinched position, such that the bias can be overcome when the rope 140 is weighted by a climber to engage the pinching mechanism 130 into a pinched position.

FIG. 1 further illustrates rope 140 includes a first portion 141 having an end 142 and a second portion 143 having an end 144. As shown, end 142 is a loop and end 144 is an enlarged portion formed by doubling the rope 140 back on itself. The thickness of end 142 and end 144 prevent the rope 140 from passing entirely through and falling out of the carabiner. Thus, end 142 can be attached to a climber by forming a girth hitch using the loop of end 142 and a portion of first portion 141, such as by forming the girth hitch on the belay loop of the climber's climbing harness. However, in other embodiments of the invention, end 142 and end 144 can take other forms, such as a loop, like end 142, an enlarged portion formed by doubling the rope back on itself, like end 144, a knot, or an unmodified free end of rope that is the same thickness as the rest of rope 140. In general, rope 140 can be any length. However, a length of between two feet and six feet is desirable and, more specifically, in most cases a length of about three feet is ideal. Moreover, while FIG. 1 shows rope 140 as a line having two ends, in other embodiments of the invention, rope 140 can be a continuous loop of rope lacking any ends. In such other embodiments, rope 140 can further include another loop within the continuous loop of rope which can be used to connect to a climbing harness.

FIG. 1 also illustrates rope 140 can freely travel through the carabiner 100 between frame 120 and pinching mechanism 130 when in the unpinched position. Accordingly, the length of the first portion 141 of rope 140 can be adjusted by selecting a different pinch point along the length of rope 140. For example, the length of first portion 141 can be elongated by pulling first portion 141, thereby shortening second portion 143. Conversely, the length of first portion 141 can be shortened by pulling second portion 143, thereby elongating second portion 143. Once the desired length of first portion 141 is selected, pinching mechanism 130 can be engaged to pinch the rope 140 in a fixed position such that the carabiner can be used as an anchor for a climber.

Figure 2A:
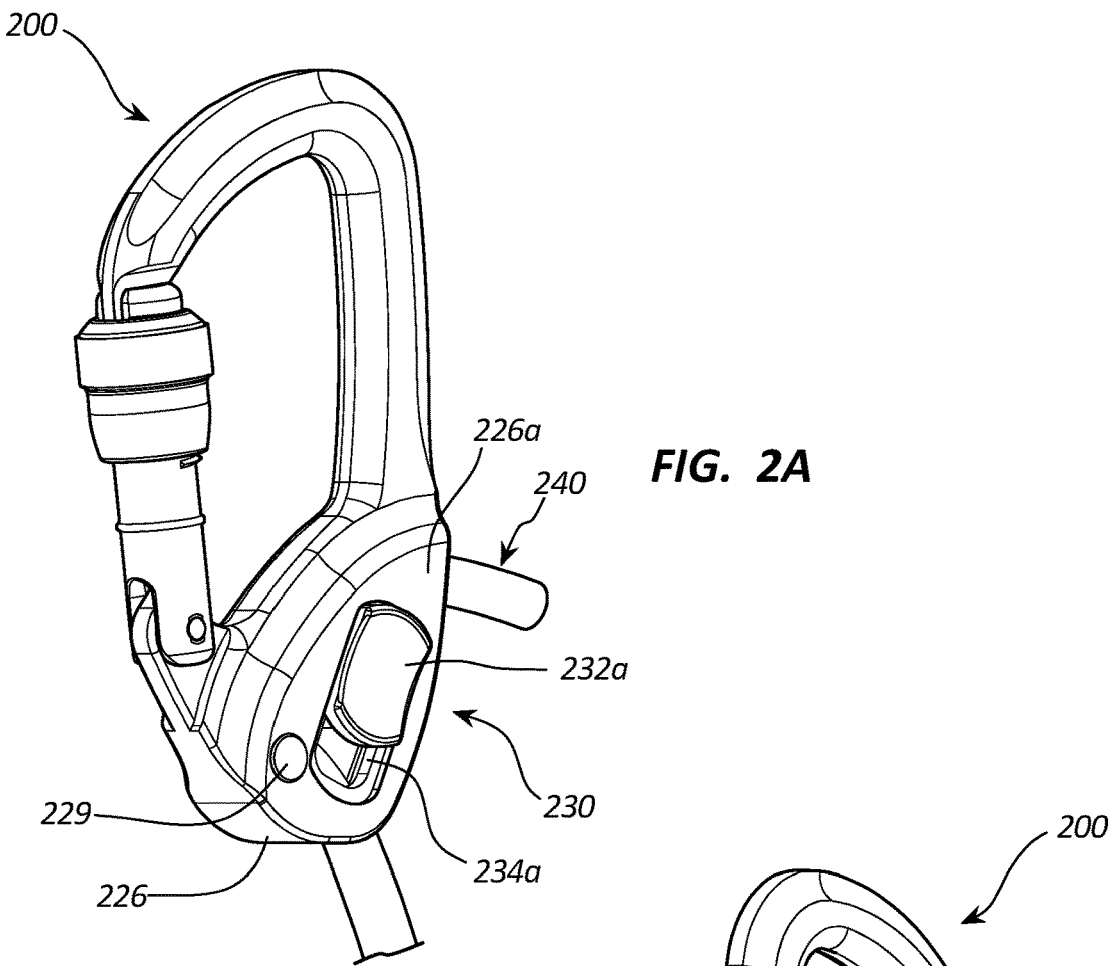
FIG. 2A illustrates a top, front, left side perspective view of an example carabiner in accordance with the first embodiment.

Turning to FIGS. 2A-2F, an example carabiner 200 is depicted in accordance with the first embodiment. In particular, FIG. 2A illustrates a top, front, left side perspective view of the example carabiner 200 in accordance with the first embodiment. The carabiner 200 includes a crotch 226 having a front side 226a, a protrusion 229, a pinching mechanism 230, and a rope 240. Pinching mechanism 230 further includes a front button 232a positioned within a front groove 234a on the front side 226a of crotch 226.

Figure 2B:
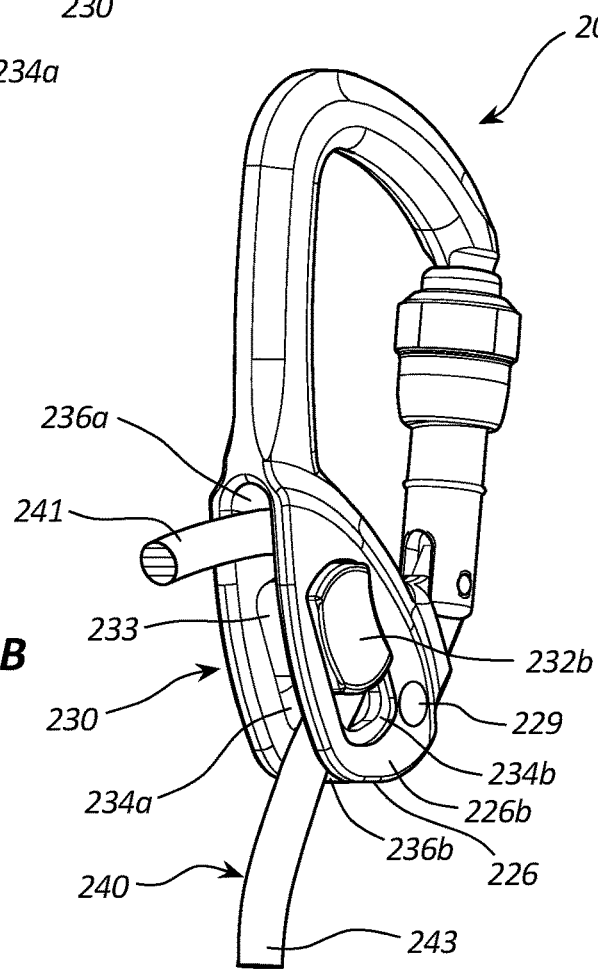
FIG. 2B illustrates a bottom, rear, right side perspective view of the example carabiner of FIG. 2A in accordance with the first embodiment.

FIG. 2B illustrates a bottom, rear, right side perspective view of the example carabiner 200 in accordance with the first embodiment. The carabiner 200 includes a crotch 226 having a rear side 226b, a protrusion 229, a pinching mechanism 230, and a rope 240. Pinching mechanism 230 further includes a rear button 232b positioned within a rear groove 234b on the rear side 226b of crotch 226. Pinching mechanism 230 also includes a stem 233 connected to both front button 232a and rear button 232b. Accordingly, a slidable pin is defined by stem 233 connected to front button 232a on one end and rear button 232b on another end. The slidable pin slides within the grooves provided by front groove 234a and rear groove 234b. Additionally, in other embodiments of the invention, pinching mechanism 230 can further include a spring that biases the slidable pin toward an unpinched position, such that the bias can be overcome when the rope 240 is weighted by a climber to engage the slidable pin into a pinched position.

Moreover, between crotch 226 and stem 233 of pinching mechanism 230, a channel is formed having a first channel opening 236a and a second channel opening 236b, each of which are configured to receive rope 240. Furthermore, FIG. 2B shows rope 240 includes a first portion 241 that enters first channel opening 236a and a second portion 243 that enters second channel opening 236b. Thus, rope 240 is configured to enter first channel opening 236a, wrap around stem 233 through the channel formed between an interior surface of crotch 226 and stem 233, and then exit second channel opening 236b.

Figure 2C:
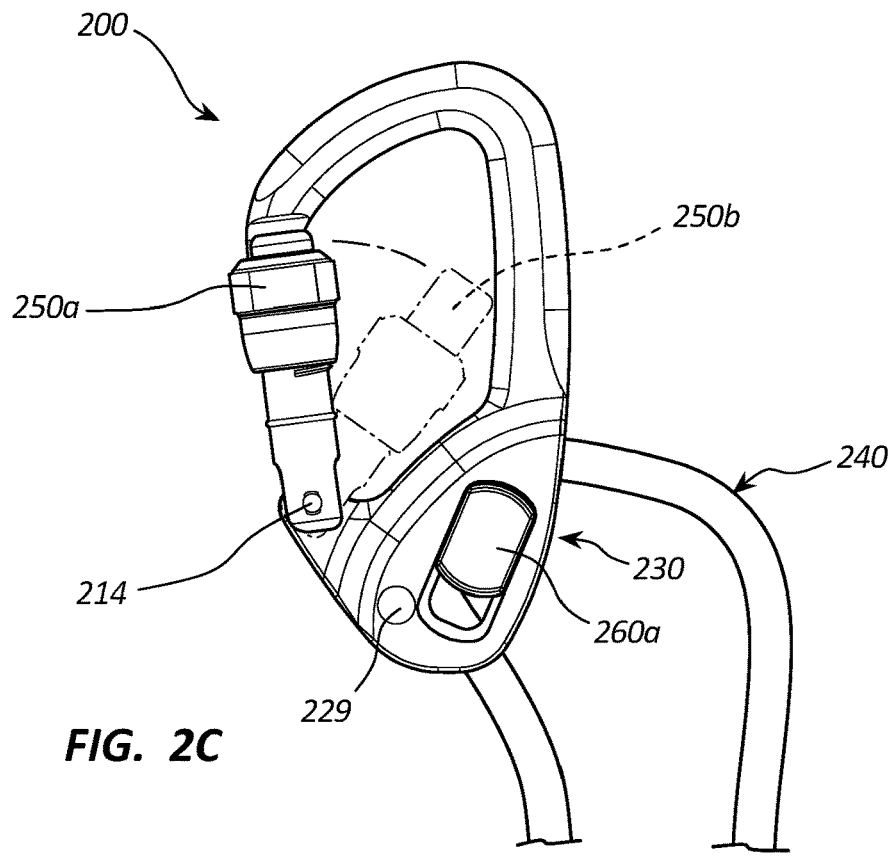
FIG. 2C illustrates a front elevational view of the example carabiner of FIG. 2A with a pinching mechanism in an unpinched position in accordance with the first embodiment.

FIG. 2C illustrates a front elevational view of the example carabiner 200 with a pinching mechanism in an unpinched position in accordance with the first embodiment. The carabiner 200 includes a gate pivotally connected to a frame by a gate pivot rod 214. The gate of carabiner 200 is configured to be movable between a closed position 250a and an open position 250b. The carabiner 200 further includes a pinching mechanism 230 having a slidable pin configured to be movable to an unpinched position 260a. In the unpinched position 260a, the slidable pin of pinching mechanism 230 is movable away from protrusion 229, thereby unpinching rope 240 between the slidable pin and the protrusion 229, and allowing rope 240 to move freely around the slidable pin.

Figure 2D:
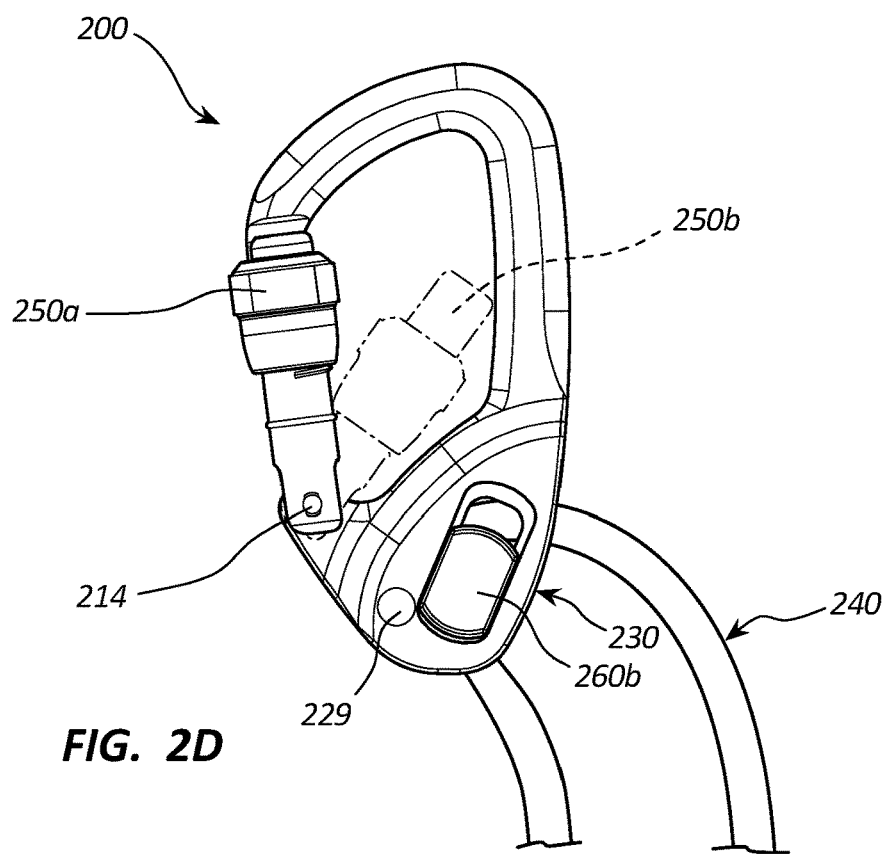
FIG. 2D illustrates a front elevational view of the example carabiner of FIG. 2A with a pinching mechanism in a pinched position in accordance with the first embodiment.

FIG. 2D illustrates a front elevational view of the example carabiner 200 with a pinching mechanism in a pinched position in accordance with the first embodiment. The carabiner 200 includes a gate pivotally connected to a frame by a gate pivot rod 214. The gate of carabiner 200 is configured to be movable between a closed position 250a and an open position 250b. The carabiner 200 further includes a pinching mechanism 230 having a slidable pin configured to be movable to a pinched position 260b. In the pinched position 260b, the slidable pin of pinching mechanism 230 is movable toward protrusion 229, thereby pinching rope 240 between the slidable pin and the protrusion 229, and preventing rope 240 from moving freely around the slidable pin. However, in one or more embodiments of the invention, the pinching mechanism 230 pinches the rope 240 against a surface of the frame of carabiner 200 rather than against a protrusion 229. Thus, it should be appreciated that protrusion 229 is optional to the functionality of pinching mechanism 230.

Figure 2E:
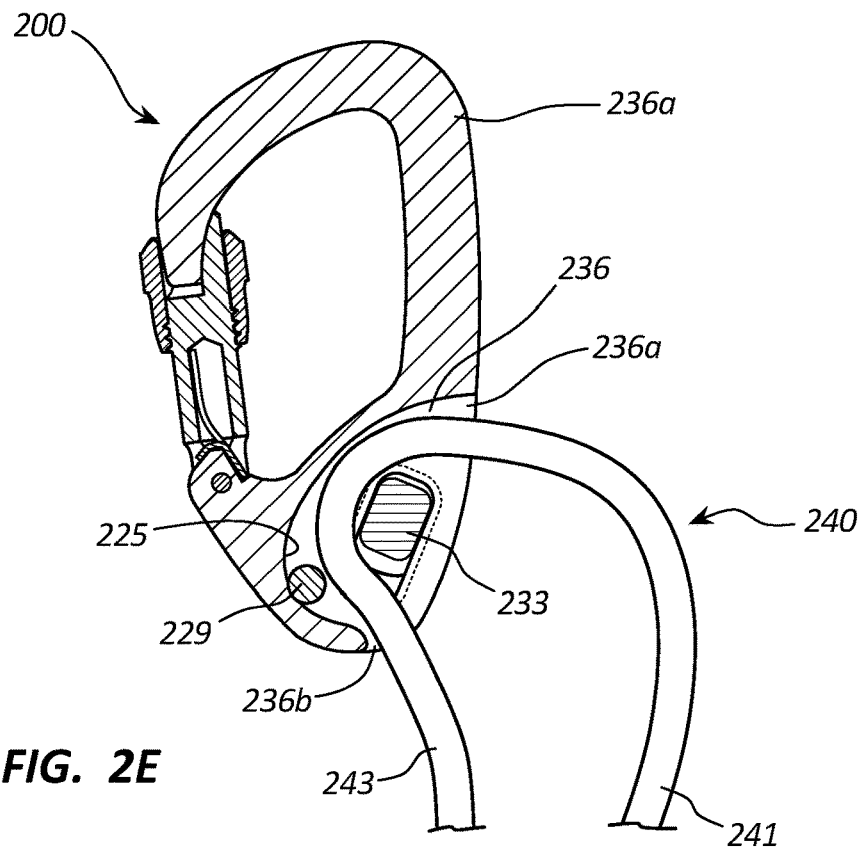
FIG. 2E illustrates a front elevational cross-sectional view of the example carabiner of FIG. 2A with a pinching mechanism in an unpinched position in accordance with the first embodiment.

FIG. 2E illustrates a front elevational cross-sectional view of the example carabiner 200 with a pinching mechanism in an unpinched position in accordance with the first embodiment. The carabiner 200 includes a frame surface 225. Carabiner 200 further includes protrusion 229 proximate frame surface 225. Frame surface 225 and stem 233 of the slidable pin of the pinching mechanism form channel 236. Accordingly, rope 240 passes through channel 236 with a first portion 241 of rope 240 entering channel 236 at first channel opening 236a, the rope 240 further traveling through the channel 236 around stem 233 and past protrusion 229 until a second portion 243 of rope 240 exits channel 236 at second channel opening 236b. As FIG. 2E illustrates, rope 240 is unpinched by the pinching mechanism since there is space between the portion of the rope 240 proximate the protrusion 229 and the stem 233. Moreover, when a force is applied to rope 240 that forces the stem 233 such that it slides toward the unpinched position, then rope 240 becomes unpinched as between protrusion 229 and stem 233.

Figure 2F:
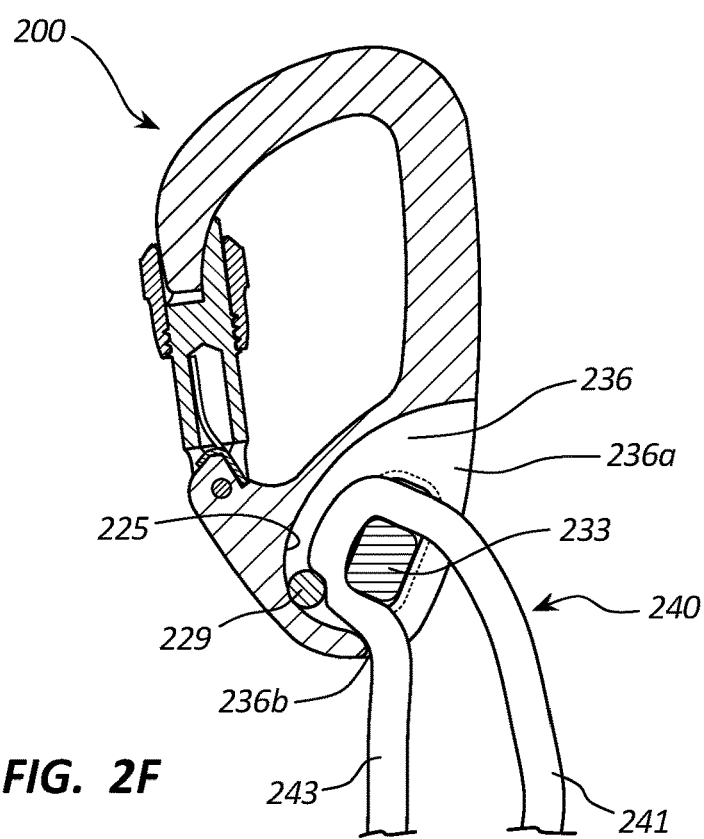
FIG. 2F illustrates a front elevational view of the example carabiner of FIG. 2A with a pinching mechanism in a pinched position in accordance with the first embodiment.

FIG. 2F illustrates a front elevational cross-sectional view of the example carabiner 200 with a pinching mechanism in a pinched position in accordance with the first embodiment. The carabiner 200 includes frame surface 225. Carabiner 200 further includes protrusion 229 proximate frame surface 225. Frame surface 225 and stem 233 of the slidable pin of the pinching mechanism form channel 236. Accordingly, rope 240 passes through channel 236 with a first portion 241 of rope 240 entering channel 236 at first channel opening 236a, the rope 240 further traveling through the channel 236 around stem 233 and past protrusion 229 until a second portion 243 of rope 240 exits channel 236 at second channel opening 236b. As FIG. 2F illustrates, rope 240 is pinched by the pinching mechanism as protrusion 229 and stem 233 compress rope 240 when stem 233 slides toward the pinched position. Moreover, when a force is applied to rope 240 that forces the stem 233 such that it slides toward the pinched position, then rope 240 becomes pinched between protrusion 229 and stem 233.

Figure 3A:
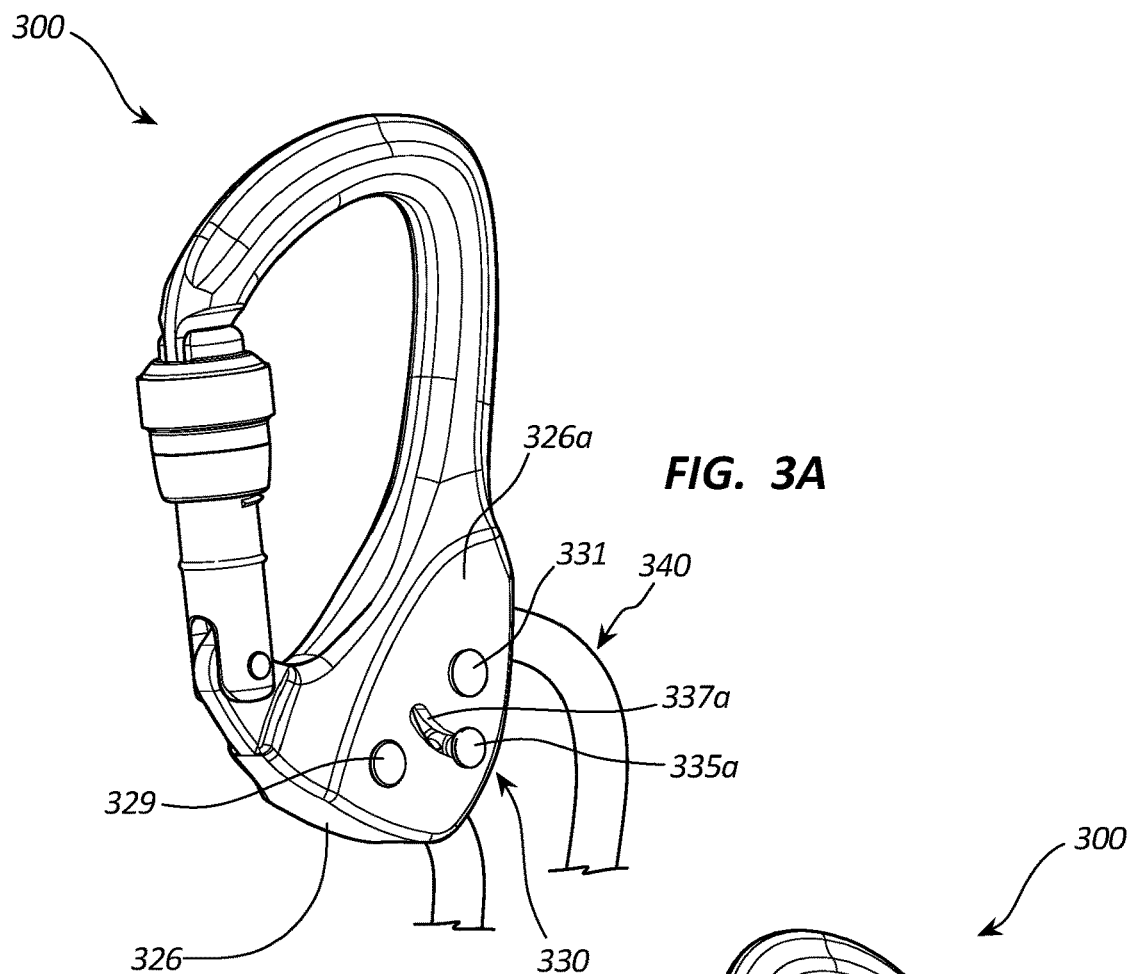
FIG. 3A illustrates a top, front, left side perspective view of an example carabiner in accordance with a second embodiment.

Turning to FIGS. 3A-3F, an example carabiner 300 is depicted in accordance with a second embodiment. In particular, FIG. 3A illustrates a top, front, left side perspective view of the example carabiner 300 in accordance with the second embodiment. The carabiner 300 includes a crotch 326 having a front side 326a, a protrusion 329, a pinching mechanism 330, and a rope 340. Pinching mechanism 330 includes a shaft 331 and a front guide rod 335a positioned within a front groove 337a on the front side 326a of crotch 326.

Figure 3B:
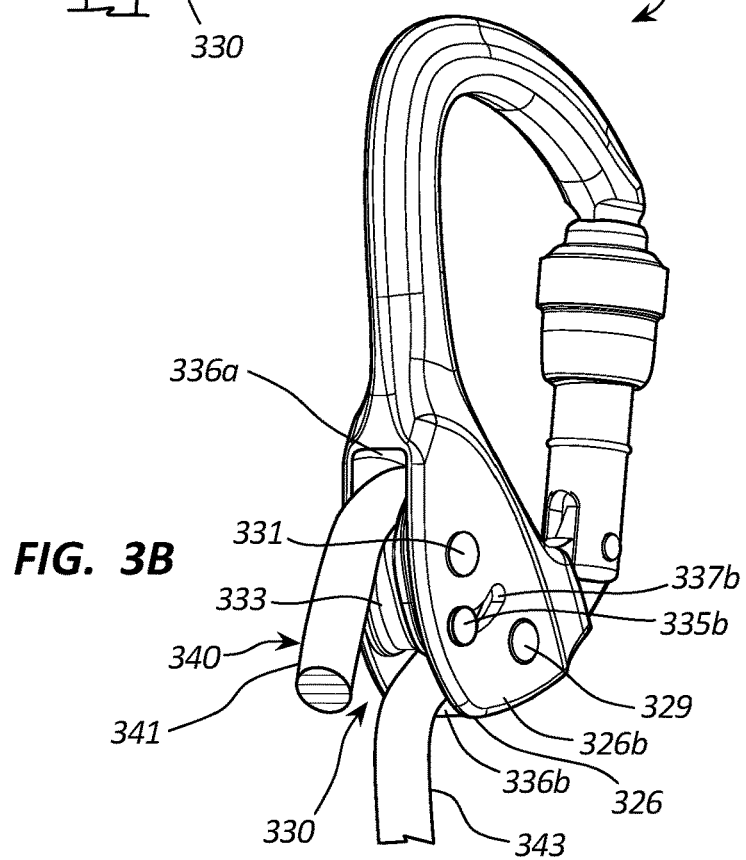
FIG. 3B illustrates a bottom, rear, right side perspective view of the example carabiner of FIG. 3A in accordance with the second embodiment.

FIG. 3B illustrates a bottom, rear, right side perspective view of the example carabiner 300 in accordance with the second embodiment. The carabiner 300 includes a crotch 326 having a rear side 326b, a protrusion 329, a pinching mechanism 330, and a rope 340. Pinching mechanism 330 further includes shaft 331 and a rear guide rod 335b positioned within a rear groove 337b on the rear side 326b of crotch 326. Pinching mechanism 330 also includes a stem 333 connected to both front guide rod 335a and rear guide rod 335b. Accordingly, a rotatable cam is defined by stem 333 connected to front guide rod 335a on one end and rear guide rod 335b on another end. The rotatable cam rotates around shaft 331 as front guide rod 335a slides within front groove 337a and rear guide rod 335b slides within rear groove 337b. Additionally, in other embodiments of the invention, pinching mechanism 330 can further include a spring that biases the rotatable cam toward an unpinched position, such that the bias can be overcome when the rope 340 is weighted by a climber to engage the rotatable cam into a pinched position.

Moreover, between crotch 326 and stem 333 of pinching mechanism 330, a channel is formed having a first channel opening 336a and a second channel opening 336b, each of which are configured to receive rope 340. Furthermore, FIG. 3B shows rope 340 includes a first portion 341 that enters first channel opening 336a and a second portion 343 that enters second channel opening 336b. Thus, rope 340 is configured to enter first channel opening 336a, wrap around stem 333 through the channel formed between an interior surface of crotch 326 and stem 333, and then exit second channel opening 336b.

Figure 3C:
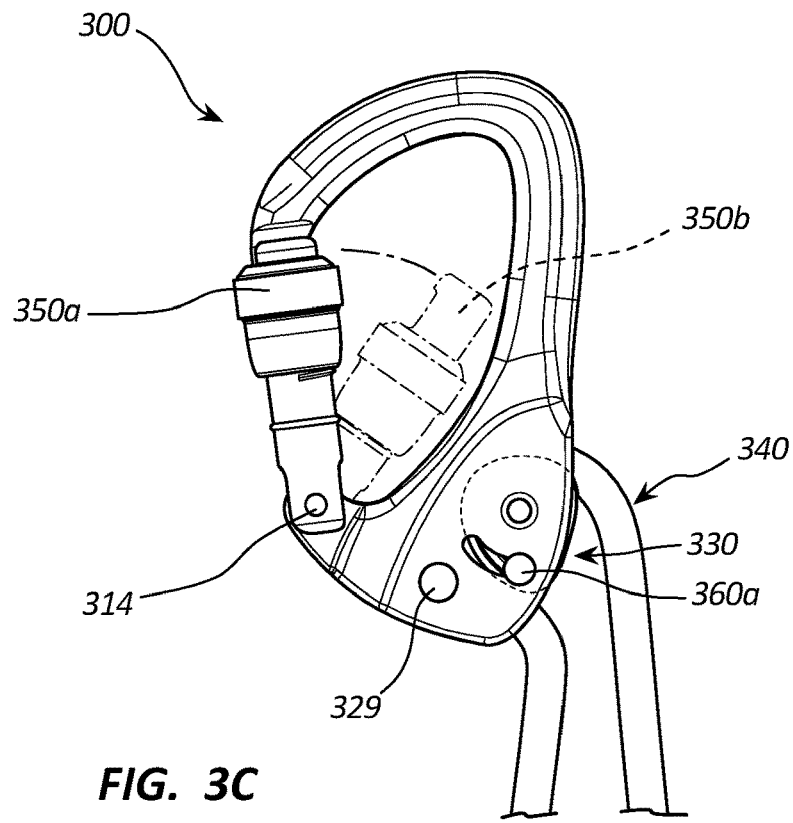
FIG. 3C illustrates a front elevational view of the example carabiner of FIG. 3A with a pinching mechanism in an unpinched position in accordance with the second embodiment.

FIG. 3C illustrates a front elevational view of the example carabiner 300 with a pinching mechanism in an unpinched position in accordance with the second embodiment. The carabiner 300 includes a gate pivotally connected to a frame by a gate pivot rod 314. The gate of carabiner 300 is configured to be movable between a closed position 350a and an open position 350b. The carabiner 300 further includes a pinching mechanism 330 having a rotatable cam configured to be movable to an unpinched position 360a. In the unpinched position 360a, the rotatable cam of pinching mechanism 330 is movable away from protrusion 329, thereby unpinching rope 340 between the rotatable cam and protrusion 329, and allowing rope 340 to move freely around the rotatable cam.

Figure 3D:
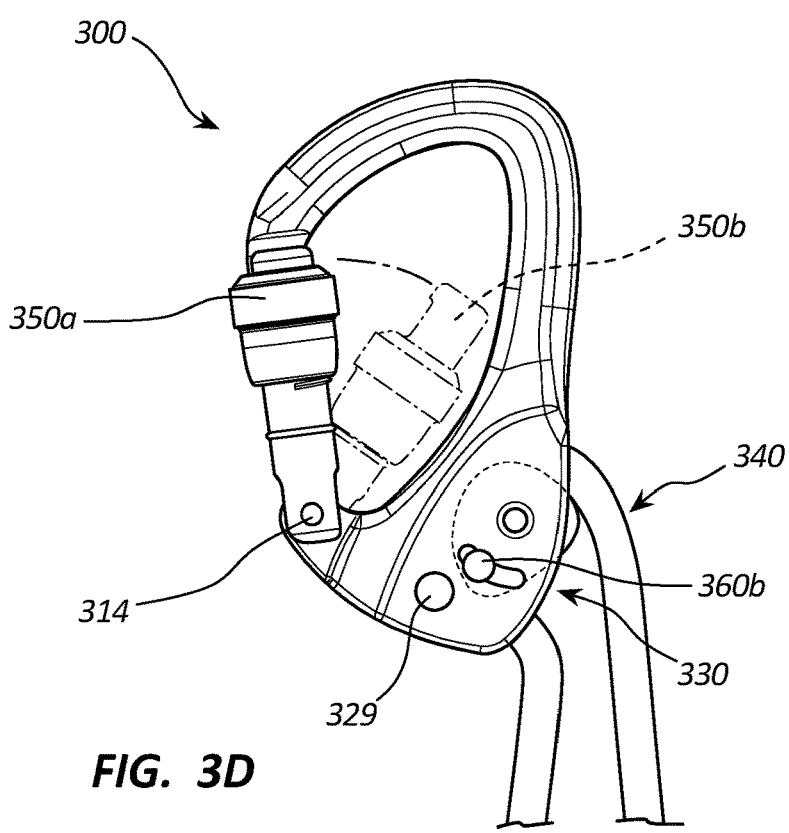
FIG. 3D illustrates a front elevational view of the example carabiner of FIG. 3A with a pinching mechanism in a pinched position in accordance with the second embodiment.

FIG. 3D illustrates a front elevational view of the example carabiner 300 with a pinching mechanism in a pinched position in accordance with the second embodiment. The carabiner 300 includes a gate pivotally connected to a frame by a gate pivot rod 314. The gate of carabiner 300 is configured to be movable between a closed position 350a and an open position 350b. The carabiner 300 further includes a pinching mechanism 330 having a rotatable cam configured to be movable to a pinched position 360b. In the pinched position 360b, the rotatable cam of pinching mechanism 330 is movable toward protrusion 329, thereby pinching rope 340 between the rotatable cam and protrusion 329, and preventing rope 340 from moving freely around the rotatable cam. However, in one or more embodiments of the invention, the pinching mechanism 330 pinches the rope 340 against a surface of the frame of carabiner 300 rather than against a protrusion 329. Thus, it should be appreciated that protrusion 329 is optional to the functionality of pinching mechanism 330.

Figure 3E:
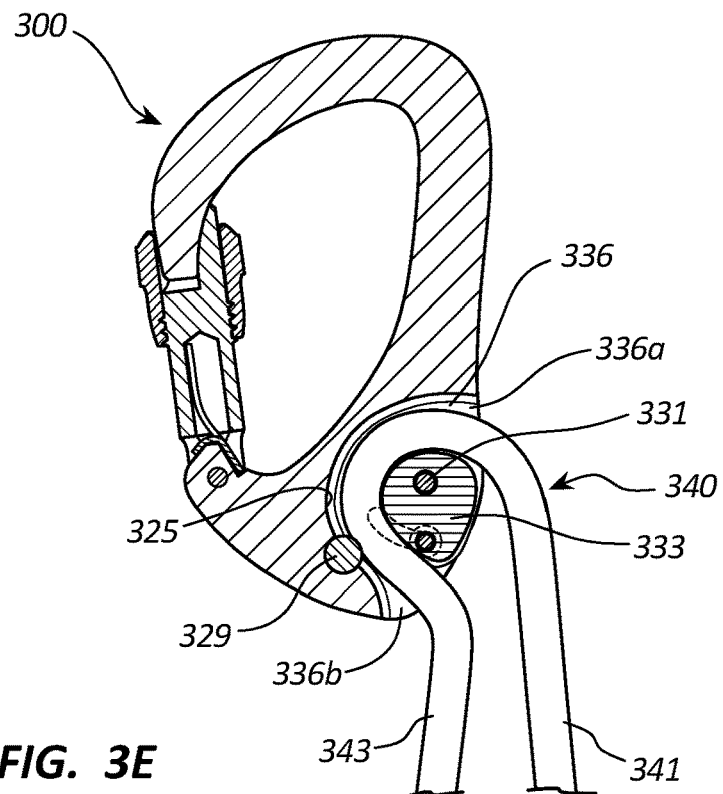
FIG. 3E illustrates a front elevational cross-sectional view of the example carabiner of FIG. 3A with a pinching mechanism in an unpinched position in accordance with the second embodiment.

FIG. 3E illustrates a front elevational cross-sectional view of the example carabiner 300 with a pinching mechanism in an unpinched position in accordance with the second embodiment. The carabiner 300 includes a frame surface 325. Carabiner 300 further includes protrusion 329 proximate frame surface 325. Frame surface 325 and stem 333 of the rotatable cam of the pinching mechanism form channel 336. Accordingly, rope 340 passes through channel 336 with a first portion 341 of rope 340 entering channel 336 at first channel opening 336a, the rope 340 further traveling through the channel 336 around stem 333 and past protrusion 329 until a second portion 343 of rope 340 exits channel 336 at second channel opening 336b. As FIG. 3E illustrates, rope 340 is unpinched by the pinching mechanism since there is space between the portion of the rope 340 proximate the protrusion 329 and the stem 333. Moreover, when a force is applied to rope 340 that forces the stem 333 such that it rotates toward the unpinched position, then rope 340 becomes unpinched as between protrusion 329 and stem 333.

Figure 3F:
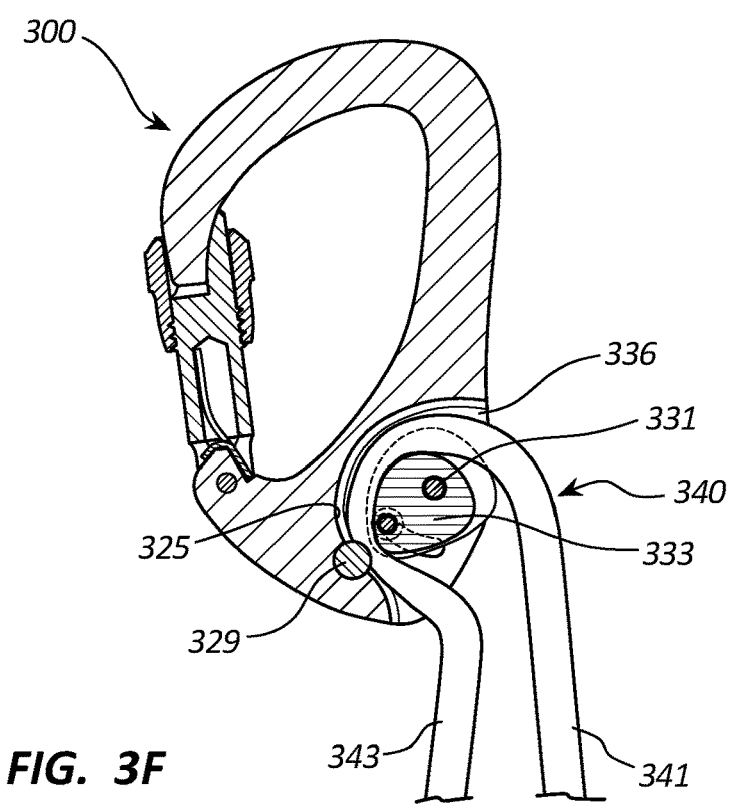
FIG. 3F illustrates a front elevational view of the example carabiner of FIG. 3A with a pinching mechanism in a pinched position in accordance with the second embodiment.

FIG. 3F illustrates a front elevational cross-sectional view of the example carabiner 300 with a pinching mechanism in a pinched position in accordance with the second embodiment. The carabiner 300 includes frame surface 325. Carabiner 300 further includes protrusion 329 proximate frame surface 325. Frame surface 325 and stem 333 of the rotatable cam of the pinching mechanism form channel 336. Accordingly, rope 340 passes through channel 336 with a first portion 341 of rope 340 entering channel 336 at first channel opening 336a, the rope 340 further traveling through the channel 336 around stem 333 and past protrusion 329 until a second portion 343 of rope 340 exits channel 336 at second channel opening 336b. As FIG. 3F illustrates, rope 340 is pinched by the pinching mechanism as protrusion 329 and stem 333 compress rope 340 when stem 333 rotates toward the pinched position. Moreover, when a force is applied to rope 340 that forces the stem 233 such that it rotates toward the pinched position, then rope 340 becomes pinched between protrusion 329 and stem 333.

Figure 4A:
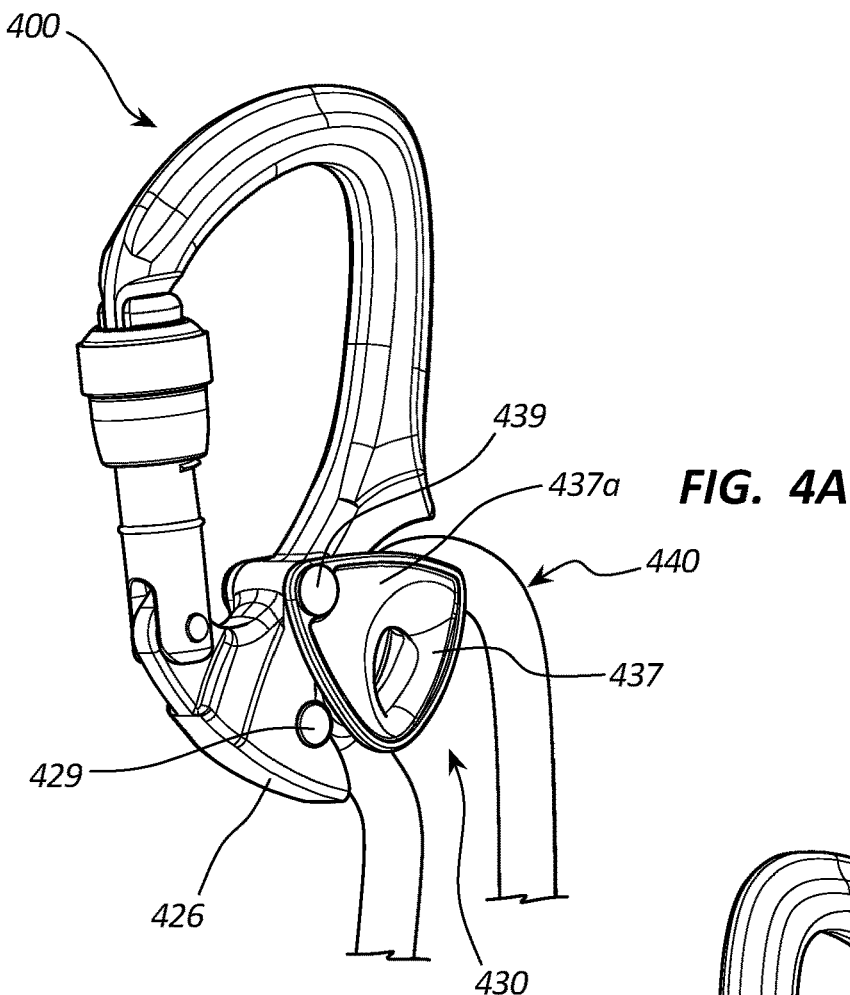
FIG. 4A illustrates a top, front, left side perspective view of an example carabiner in accordance with a third embodiment.

Turning to FIGS. 4A-4F, an example carabiner 400 is depicted in accordance with a third embodiment. In particular, FIG. 4A illustrates a top, front, left side perspective view of the example carabiner 400 in accordance with the third embodiment. The carabiner 400 includes a crotch 426, a protrusion 429, a pinching mechanism 430, and a rope 440. Pinching mechanism 430 includes a pivot 439 and a block 437 pivotally connected to pivot 439. The block 437 includes a front side 437a.

Figure 4B:
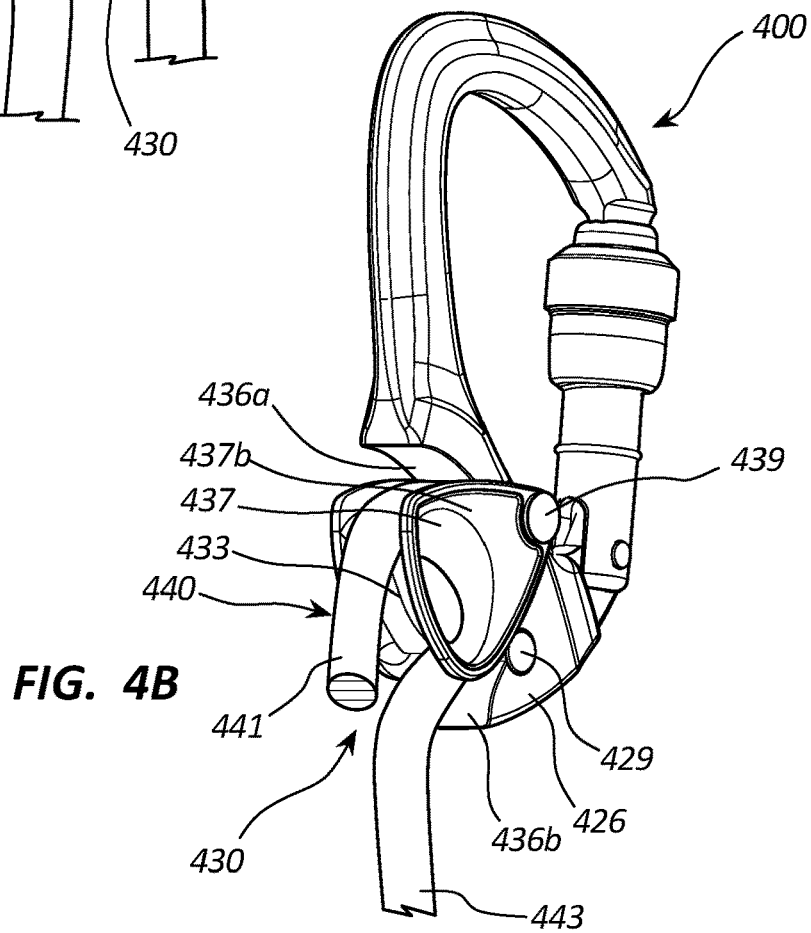
FIG. 4B illustrates a bottom, rear, right side perspective view of the example carabiner of FIG. 4A in accordance with the third embodiment.

FIG. 4B illustrates a bottom, rear, right side perspective view of the example carabiner 400 in accordance with the third embodiment. The carabiner 400 includes a crotch 426, a protrusion 429, a pinching mechanism 430, and a rope 440. Pinching mechanism 430 further includes pivot 439 and block 437 pivotally connected to pivot 439. The block 437 further includes rear side 437b. Pinching mechanism 430 also includes a stem 433 connected between both front side 437a and rear side 437b. The surface of stem 433 is a groove or concave perimeter surface configured to receive and guide rope 440. Accordingly, a pivotable block 437 is defined by stem 433 connected between both front side 437a and rear side 437b. The pivotable block 437 pivots about pivot 439. Additionally, in other embodiments of the invention, pinching mechanism 430 can further include a spring that biases pivotable block 437 toward an unpinched position, such that the bias can be overcome when the rope 440 is weighted by a climber to engage pivotable block 437 into a pinched position.

Moreover, between crotch 426 and stem 433 of pinching mechanism 430, a channel is formed having a first channel opening 436a and a second channel opening 436b, each of which are configured to receive rope 440. Furthermore, FIG. 4B shows rope 440 includes a first portion 441 that enters first channel opening 436a and a second portion 443 that enters second channel opening 436b. Thus, rope 440 is configured to enter first channel opening 436a, wrap around stem 433 through the channel formed between an interior surface of crotch 426 and stem 433, and then exit second channel opening 436b.

Figure 4C:
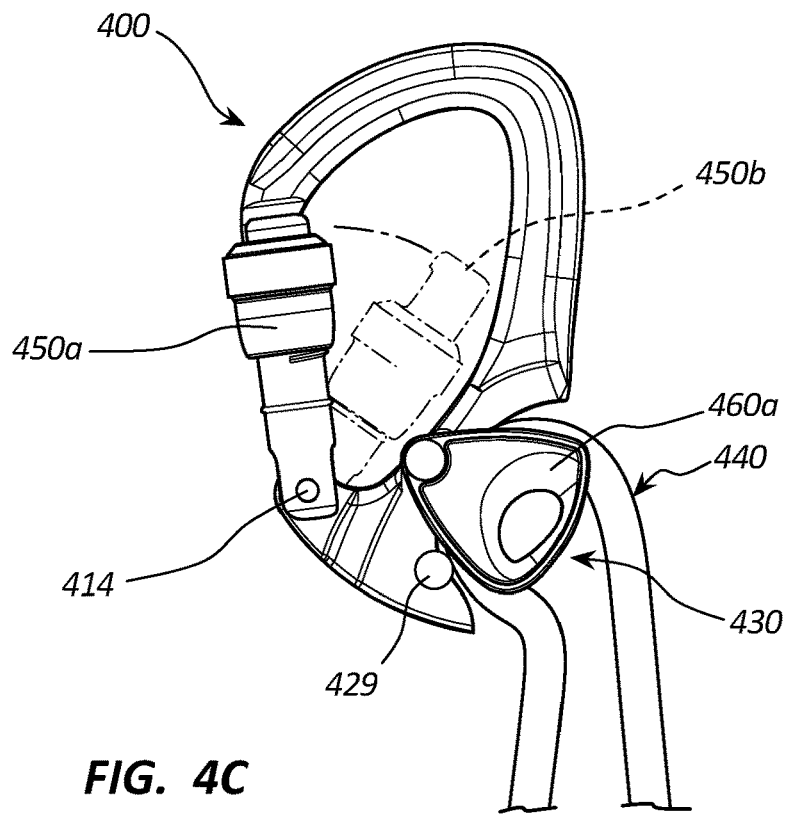
FIG. 4C illustrates a front elevational view of the example carabiner of FIG. 4A with a pinching mechanism in an unpinched position in accordance with the third embodiment.

FIG. 4C illustrates a front elevational view of the example carabiner 400 with a pinching mechanism in an unpinched position in accordance with the third embodiment. The carabiner 400 includes a gate pivotally connected to a frame by a gate pivot rod 414. The gate of carabiner 400 is configured to be movable between a closed position 450a and an open position 450b. The carabiner 400 further includes a pinching mechanism 430 having a pivotable block configured to be movable to an unpinched position 460a. In the unpinched position 460a, the rotatable cam of pinching mechanism 430 is movable away from protrusion 429, thereby unpinching rope 440 between the pivotable block and protrusion 429, and allowing rope 440 to move freely around the pivotable block.

Figure 4D:
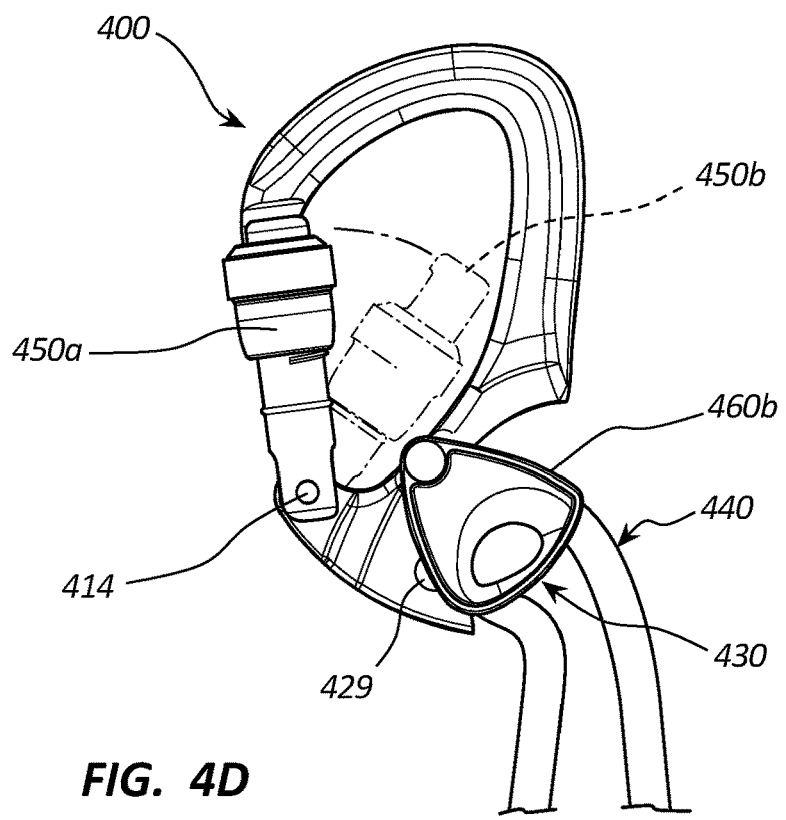
FIG. 4D illustrates a front elevational view of the example carabiner of FIG. 4A with a pinching mechanism in a pinched position in accordance with the third embodiment.

FIG. 4D illustrates a front elevational view of the example carabiner 400 with a pinching mechanism in a pinched position in accordance with the third embodiment. The carabiner 400 includes a gate pivotally connected to a frame by a gate pivot rod 414. The gate of carabiner 400 is configured to be movable between a closed position 450a and an open position 450b. The carabiner 400 further includes a pinching mechanism 430 having a pivotable block configured to be movable to a pinched position 460b. In the pinched position 460b, the pivotable block of pinching mechanism 430 is movable toward protrusion 429, thereby pinching rope 440 between the pivotable block and protrusion 429, and preventing rope 440 from moving freely around the pivotable block. However, in one or more embodiments of the invention, the pinching mechanism 430 pinches the rope 440 against a surface of the frame of carabiner 400 rather than against a protrusion 429. Thus, it should be appreciated that protrusion 429 is optional to the functionality of pinching mechanism 430.

Figure 4E:
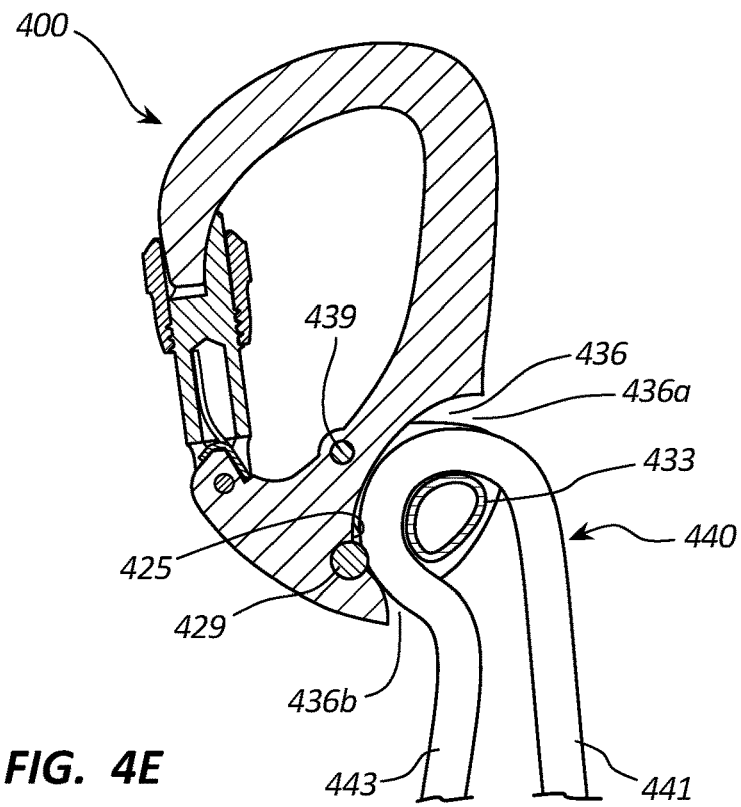
FIG. 4E illustrates a front elevational cross-sectional view of the example carabiner of FIG. 4A with a pinching mechanism in an unpinched position in accordance with the third embodiment.

FIG. 4E illustrates a front elevational cross-sectional view of the example carabiner 400 with a pinching mechanism in an unpinched position in accordance with the third embodiment. The carabiner 400 includes a frame surface 425. Carabiner 400 further includes protrusion 429 proximate frame surface 425. Frame surface 425 and stem 433 of the pivotable block of the pinching mechanism form channel 436. Accordingly, rope 440 passes through channel 436 with a first portion 441 of rope 440 entering channel 436 at first channel opening 436a, the rope 440 further traveling through the channel 436 around stem 433 and past protrusion 429 until a second portion 443 of rope 440 exits channel 436 at second channel opening 436b. As FIG. 4E illustrates, rope 440 is unpinched by the pinching mechanism since there is space between the portion of the rope 440 proximate the protrusion 429 and the stem 433. Moreover, when a force is applied to rope 440 that forces the stem 433 such that it pivots toward the unpinched position, then rope 440 becomes unpinched as between protrusion 429 and stem 433.

Figure 4F:
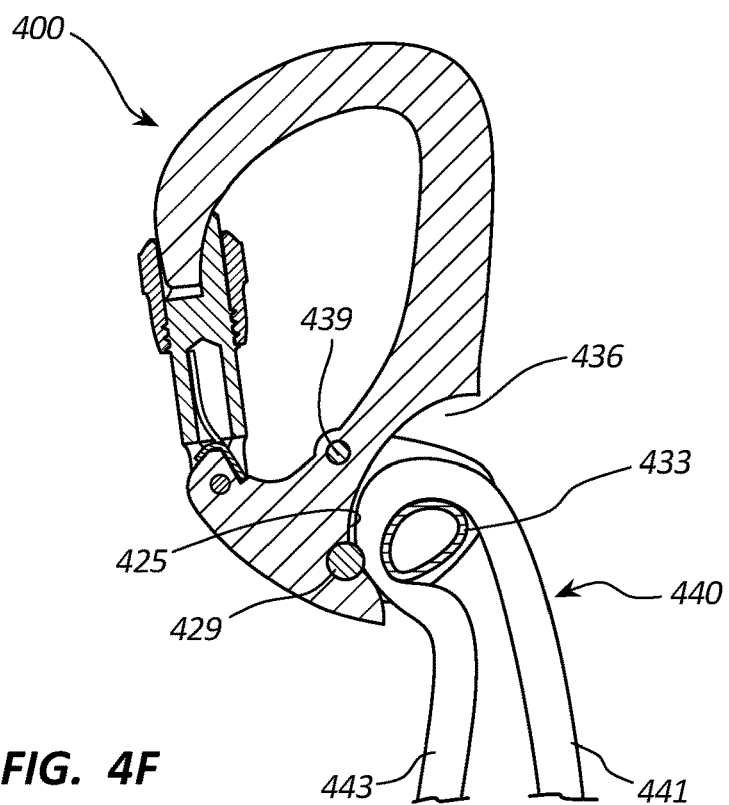
FIG. 4F illustrates a front elevational view of the example carabiner of FIG. 4A with a pinching mechanism in a pinched position in accordance with the third embodiment.

FIG. 4F illustrates a front elevational cross-sectional view of the example carabiner 400 with a pinching mechanism in a pinched position in accordance with the third embodiment. The carabiner 400 includes frame surface 425. Carabiner 400 further includes protrusion 429 proximate frame surface 425. Frame surface 425 and stem 433 of the rotatable cam of the pinching mechanism form channel 436. Accordingly, rope 440 passes through channel 436 with a first portion 441 of rope 440 entering channel 436 at first channel opening 436*a*, the rope 440 further traveling through the channel 436 around stem 433 and past protrusion 429 until a second portion 443 of rope 440 exits channel 436 at second channel opening 436*b*. As FIG. 4F illustrates, rope 440 is pinched by the pinching mechanism as protrusion 429 and stem 433 compress rope 440 when stem 433 pivots toward the pinched position. Moreover, when a force is applied to rope 440 that forces the stem 433 such that it rotates toward the pinched position, then rope 440 becomes pinched between protrusion 429 and stem 433.

Figure 5:
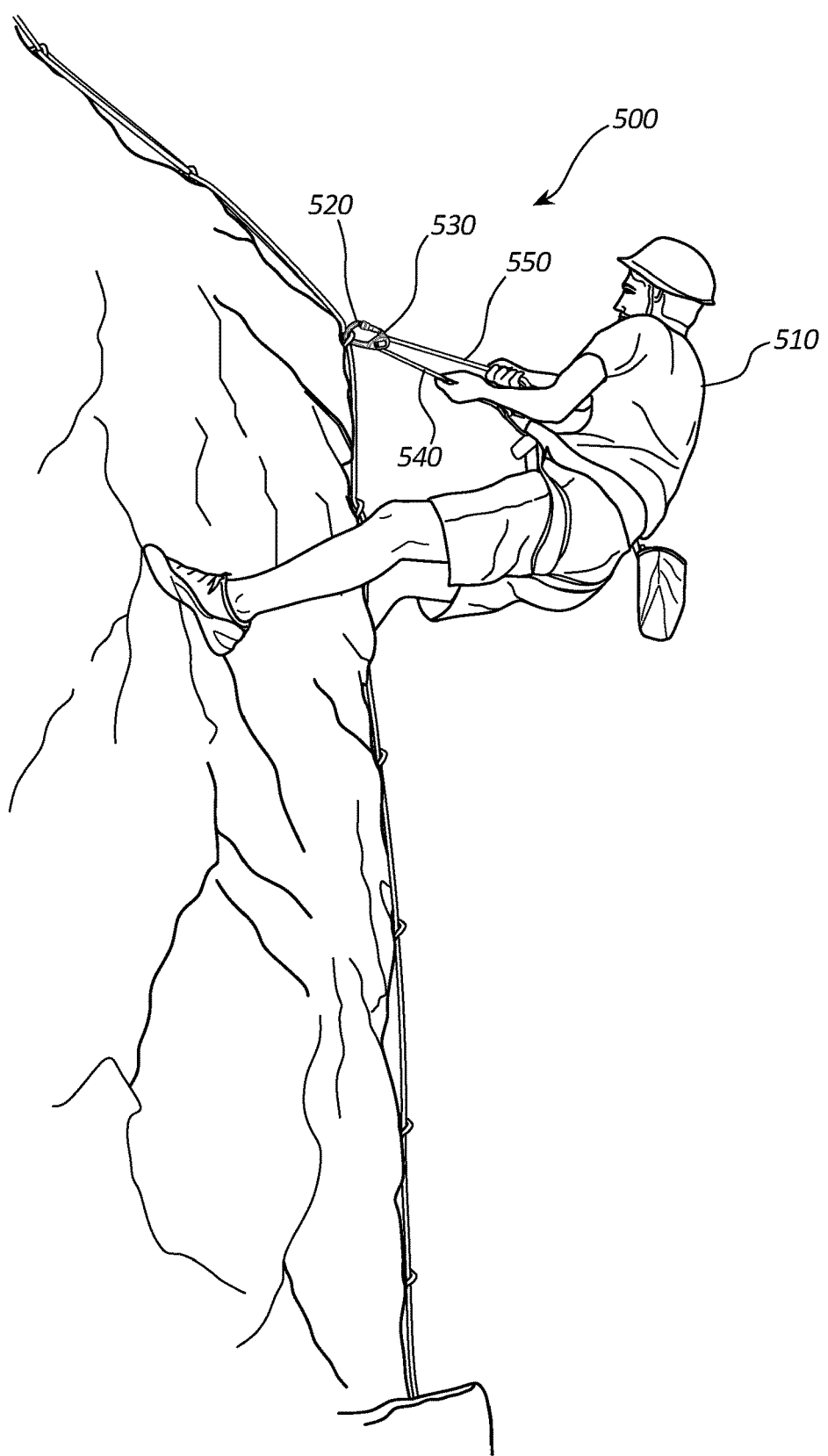
FIG. 5 illustrates a sample use of the example carabiner of FIG. 1 in accordance with the first embodiment.

Turning to FIG. 5, a sample use of the example carabiner 100 of FIG. 1 is depicted in accordance with the first embodiment. In particular, FIG. 5 illustrates a sample use 500 by a climber 510 of the carabiner 520 in accordance with the first embodiment. Carabiner 520 includes a pinching mechanism 530 and a rope with a first portion 540 and a second portion 550. First portion 540 of the rope is attached to the climbing harness of climber 510. Second end 550 of the rope is held in the right hand of climber 510. Moreover, the carabiner 520 can be used as an anchor by climber 510. As a first step, the climber proceeds with attaching first portion 540 of the rope to the climbing harness of climber 510. For example, assuming first portion 540 of rope includes a loop, a girth hitch can be used to attach first portion 540 to one or more of the belay loop, tie-in loops, or waistbelt of the climbing harness of climber 510. As a second step, the climber 510 proceeds with adjusting the length of first portion 540 of the rope as far as is needed to reach an anchor point in a support surface, such as a permanent bold in a rock wall. As a third step, the climber 510 proceeds with opening the gate of carabiner 520 to connect to the anchor point. As a fourth step, once carabiner 520 is connected to the anchor point, the climber 510 proceeds with closing the gate of carabiner 520 and locking any locking sleeve of the gate of the carabiner 520, if any. As a fifth step, once the carabiner 520 is locked on the anchor point, the climber 510 proceeds with pulling second portion 550 of the rope to achieve a desired length of first portion 540 of the rope. As a sixth step, the climber 510 proceeds with weighting the carabiner 520 on first portion 540 of the rope such that the pinching mechanism 530 is engaged to pinch the rope.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A carabiner comprising:
   a frame comprising a frame surface, the frame surface comprising a protrusion;
   a gate pivotally connected to the frame, the gate movable between a closed position and an open position; and
   a pinching mechanism integrated into the frame forming a channel between the frame and the pinching mechanism, the pinching mechanism movable between a pinched position and an unpinched position, the pinching mechanism comprising a stem movable toward the frame surface to pinch toward the frame surface when in the pinched position and movable away from the frame surface to unpinch away from the frame surface when in the unpinched position, wherein the frame surface is positioned proximate the channel.

2. The carabiner of claim 1, wherein the frame further comprises:
   a nose that mates with the gate in the closed position;
   a basket adjacent to the nose, the basket substantially perpendicular to the gate in the closed position;
   a spine adjacent to the basket, the spine opposite the gate in the closed position;
   a crotch adjacent to the spine, the crotch opposite the basket; and
   a gate pivot head that protrudes from the crotch to pivotally connect to the gate using a gate pivot rod.

3. The carabiner of claim 1, wherein the gate is capable of locking when the gate is in the closed position.

4. The carabiner of claim 1, wherein the pinching mechanism comprises one of:
   a slidable pin;
   a rotatable cam; or
   a pivotable block.

5. The carabiner of claim 1, wherein the pinching mechanism is integrated into the frame at a crotch of the frame.

6. The carabiner of claim 1, further comprising:
   a rope passing through the channel, the rope configured to be pinched between the frame and the pinching mechanism when in the pinched position and unpinched between the frame and the pinching mechanism when in the unpinched position, the rope further comprising:
      a first portion having a first end that prevents the first end from traveling completely through the channel by way of a first channel opening; and
      a second portion having a second end that prevents the second end from traveling completely through the channel by way of a second channel opening.

7. The carabiner of claim 1:
   wherein the pinching mechanism moves toward the pinched position when force is applied to the pinching mechanism in a direction that forces the pinching mechanism toward the frame surface; and
   wherein the pinching mechanism moves toward the unpinched position when force is applied to the pinching mechanism in a direction that forces the pinching mechanism away from the frame surface.

8. A carabiner comprising:
   a frame comprising a crotch, the crotch comprising:
      a front side;
      a rear side opposite the front side;
      a front groove on the front side; and
      a rear groove on the rear side;
   a gate pivotally connected to the frame, the gate movable between a closed position and an open position; and
   a pinching mechanism integrated into the frame, the pinching mechanism movable between a pinched position and an unpinched position, the pinching mechanism comprising a pin slidably mounted within the frame, the pin comprising:
      a front button slidably mounted within the front groove;
      a rear button slidably mounted within the rear groove; and
      a stem connected to the front button and the rear button; and wherein the crotch and the stem form a channel between the frame and the pinching mechanism.

9. The carabiner of claim 8, wherein the channel further comprises:
   a first channel opening configured to receive a first portion of a rope; and
   a second channel opening configured to receive a second portion of the rope.

10. The carabiner of claim 8, wherein the crotch further comprises a protrusion positioned proximate the channel.

11. The carabiner of claim 8:
   wherein the pin moves toward the pinched position when force is applied to the pin in a direction that forces the pin toward a frame surface positioned proximate the channel; and
   wherein the pin moves toward the unpinched position when force is applied to the pin in a direction that forces the pin away from the frame surface positioned proximate the channel.

12. A carabiner comprising:
   a frame comprising a crotch, the crotch comprising:
      a front side;
      a rear side opposite the front side;
      a front groove on the front side; and
      a rear groove on the rear side;
   a gate pivotally connected to the frame, the gate movable between a closed position and an open position; and
   a pinching mechanism integrated into the frame, the pinching mechanism movable between a pinched position and an unpinched position, the pinching mechanism comprising:
      a shaft; and
      a cam rotationally connected to the shaft, the cam comprising:
         a front guide rod slidably mounted within the front groove;
         a rear guide rod slidably mounted within the rear groove; and
         a stem connected to the front guide rod and the rear guide rod; and
   wherein the crotch and the stem form a channel between the frame and the pinching mechanism.

13. The carabiner of claim 12, wherein the channel further comprises:
   a first channel opening configured to receive a first portion of a rope; and
   a second channel opening configured to receive a second portion of the rope.

14. The carabiner of claim 12, wherein the crotch further comprises a protrusion positioned proximate the channel.

15. The carabiner of claim 12, wherein the pinching mechanism further comprises a spring that biases the cam toward the unpinched position.

16. The carabiner of claim 12:
   wherein the cam moves toward the pinched position when force is applied to the cam in a direction that forces the cam toward a frame surface positioned proximate the channel; and
   wherein the cam moves toward the unpinched position when force is applied to the cam in a direction that forces the cam away from the frame surface positioned proximate the channel.

* * * * *